United States Patent
Yeh et al.

(10) Patent No.: US 8,602,472 B2
(45) Date of Patent: Dec. 10, 2013

(54) ROBOTIC CLAW AND ROBOT USING SAME

(75) Inventors: Chi-Hsien Yeh, Tu-Cheng (TW); Zhong Qin, Shenzhen (CN); Jie Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 329 days.

(21) Appl. No.: 13/152,422

(22) Filed: Jun. 3, 2011

(65) Prior Publication Data

US 2012/0216647 A1     Aug. 30, 2012

(30) Foreign Application Priority Data

Feb. 25, 2011 (CN) .......................... 2011 1 0045890

(51) Int. Cl.
*B25J 15/00*  (2006.01)

(52) U.S. Cl.
USPC ............... 294/195; 294/94; 294/907; 901/37; 901/46

(58) Field of Classification Search
USPC ........... 294/86.24, 86.25, 87.1, 87.26, 89, 93, 294/94, 193, 195, 907; 901/35, 37, 39, 46
See application file for complete search history.

(56) References Cited

U.S. PATENT DOCUMENTS

| | | | | | |
|---|---|---|---|---|---|
| 2,179,594 | A | * | 11/1939 | Johnson | 294/86.22 |
| 4,017,115 | A | * | 4/1977 | Holt et al. | 294/89 |
| 4,071,149 | A | * | 1/1978 | Deguchi | 414/27 |
| 4,863,205 | A | * | 9/1989 | Schron et al. | 294/82.28 |
| 5,698,030 | A | * | 12/1997 | Rubenchik | 118/52 |
| 6,736,586 | B2 | * | 5/2004 | Harris et al. | 414/626 |
| 2010/0181791 | A1 | * | 7/2010 | O'Dell | 294/93 |

* cited by examiner

*Primary Examiner* — Dean Kramer
(74) *Attorney, Agent, or Firm* — Altis Law Group, Inc.

(57) ABSTRACT

A robotic claw includes a sleeve, a rod, a plurality of balls and a plunger. The sleeve comprises a mounting portion and a clamping portion. A mounting hole defined at an end of the mounting portion. A plurality of receiving through holes defined in the clamping portion, and an assembling hole communicating with the receiving through hole, and is defined at an end of the clamping portion. The balls are movably received in the receiving through holes correspondingly. The rod comprises an urging portion movably received in the sleeve to push the balls toward the receiving through holes. The plunger seals the assembling hole to prevent the balls from dropping out of the receiving through holes, and the balls can be mounted in the receiving through holes through the assembling hole.

17 Claims, 5 Drawing Sheets

ROBOTIC CLAW AND ROBOT USING SAME

BACKGROUND

1. Technical Field

The present disclosure relates to holding structures, particularly to a robotic claw and a robot using the claw.

2. Description of Related Art

Presently, robots are widespread in automatic production devices. A robotic claw is an important part of a robot for gripping an object, e.g., a workpiece. One such robotic claw generally includes a sleeve, a rod, and a plurality of balls. The sleeve includes a clamping portion and a mounting portion connected to the clamping portion. The clamping portion defines a plurality of receiving through holes in an inner wall of the clamping portion. The balls are mounted in the clamping portion of the sleeve and correspond to the receiving through holes. An object held by the robotic claw defines a latching hole and a plurality of latching grooves are defined in a side wall of the latching hole corresponding to the receiving through holes. The rod is moveably received in the sleeve to push the balls towards the corresponding receiving through holes to clamp the object. Generally, many objects for clamping are very small, and a diameter of the latching hole defined on the object is also smaller. Thus, a diameter of the sleeve should be small enough to move into the latching hole of the object, and a diameter of the balls should be small enough to be mounted into the clamping portion of the sleeve. However, if the diameter of the balls is unduly small, it is difficult for the robotic claw to clamp the object due to a smaller friction force produced between the balls and the object.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of robotic claw and robot using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
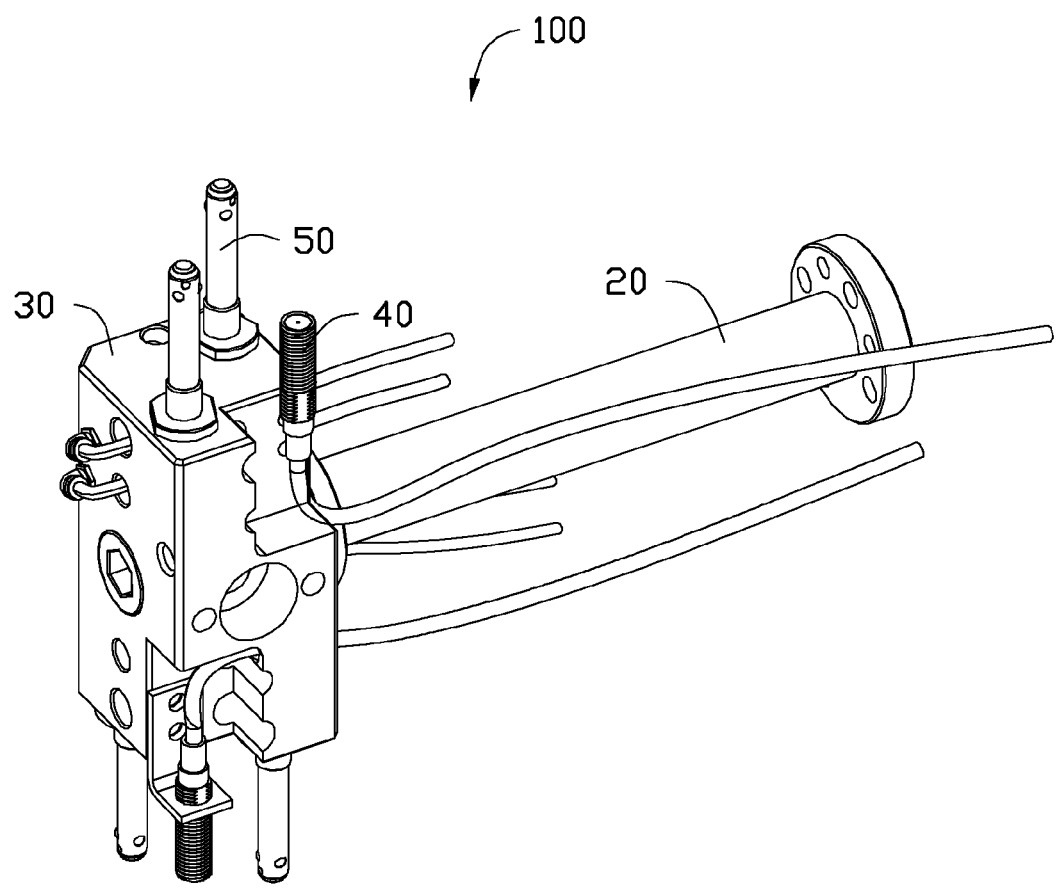
FIG. 1 is a partial, isometric view of an embodiment of a robot; the robot includes four robotic claws.
Figure 2:
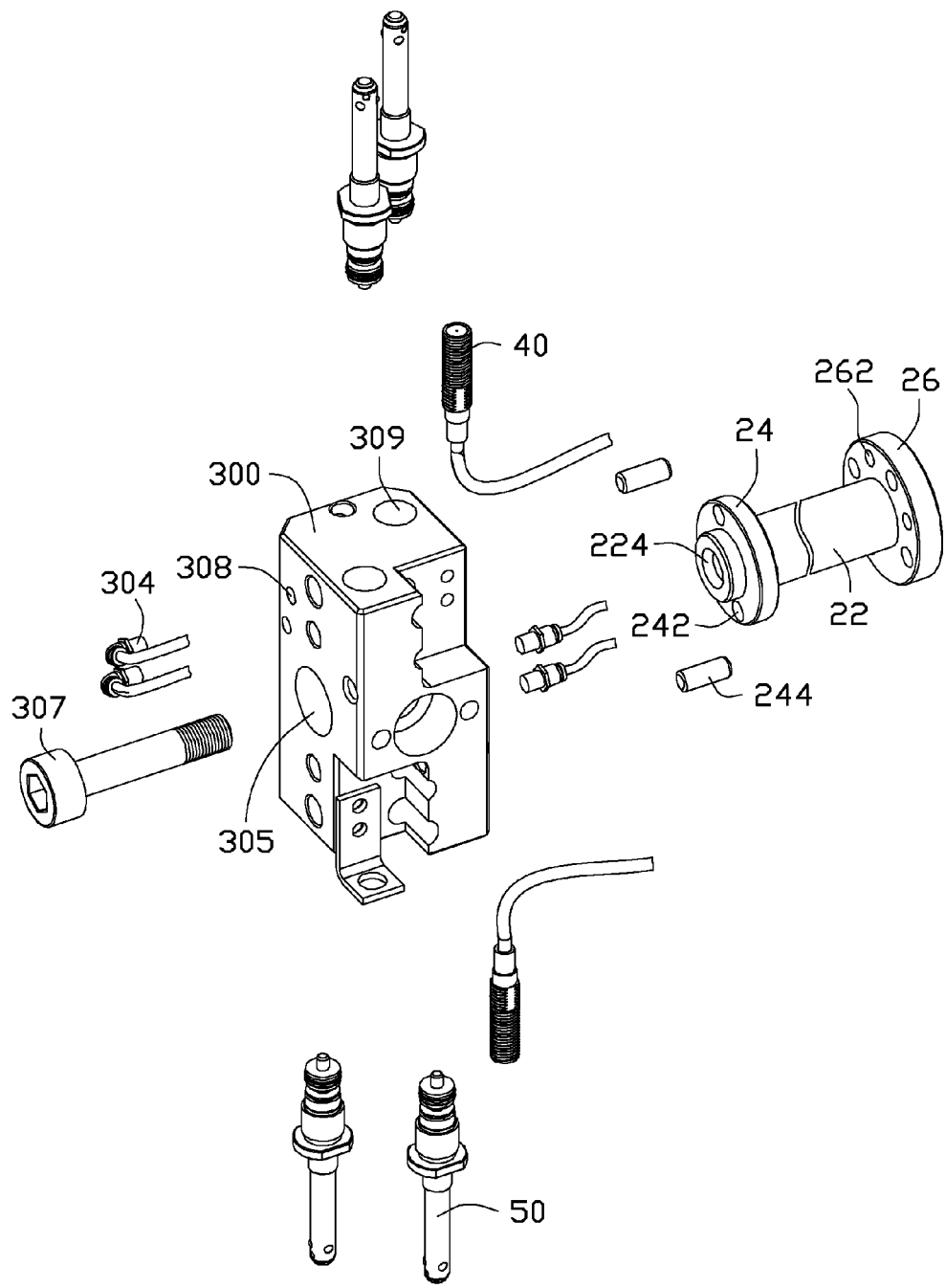
FIG. 2 is an exploded, isometric view of the robot of FIG. 1.

Referring to FIGS. 1 and 2, an embodiment of a robot 100 includes a robotic arm 20, an air cylinder 30, a pair of position sensors 40, and four robotic claws 50. The cylinder 30 is fixed to an end of the arm 20. The sensors 40 and the claws 50 are both assembled on the cylinder 30.

The arm 20 is connected to a driving mechanism (not shown) of the robot 100. The cylinder 30 and the claws 50 move as the arm 20 moves. In the illustrated embodiment, the arm 20 is substantially a hollow cylinder for decreasing the total weight of the robot 100. The arm 20 includes a cylindrical base portion 22, a first flange joint 24, and a second flange joint 26. The flange joints 24, 26 are formed on the base portion 22 adjacent to opposite ends of the base portion 22 respectively. The flange joint 24 is adjacent to the cylinder 30 and the flange joint 26 is away from the cylinder 30. Two threaded through holes 242 are defined in the flange joint 24. The cylinder 30 is fixed to the arm 20 by two screws 244 screwed into the corresponding through holes 242. An assembling hole 224 is defined at the end of the base portion 22 adjacent to the cylinder 30. A plurality of locking holes 262 are defined in the flange joint 26. The arm 20 is locked to the driving mechanism by a fixing member (not shown) passing through the locking holes 262.

In the illustrated embodiment, the cylinder 30 includes a cylinder body 300 and two pairs of gas tubes 304. The cylinder body 300 defines two pairs of gas inlets 308 in opposite side walls of the cylinder body 300. The tubes 304 are engaged with the corresponding gas inlets 308. The cylinder body 300 defines two pair of positioning holes 309 to fix two pairs of the claws 50 correspondingly. The positioning holes 309 communicate with the corresponding gas inlet 308. Gas from a pneumatic device (not shown) can be introduced into the positioning holes 309 via the gas tubes 304. The robot 100 further includes a bolt 307, and the cylinder body 300 also defines a through hole 305 at the center of the cylinder body 300. The bolt 307 extends through the through hole 305 and engages with the assembling hole 224 to fix the cylinder 30 to the arm 22.

The sensors 40 are located adjacent to two pairs of the claws 50, respectively, and connected to a control module (not shown) of the robot 100. Each sensor 40 can sense a distance from the claw 50 to the object to be held by the claw 50 and send a message of the distance to the control module of the robot 100.

Figure 3:
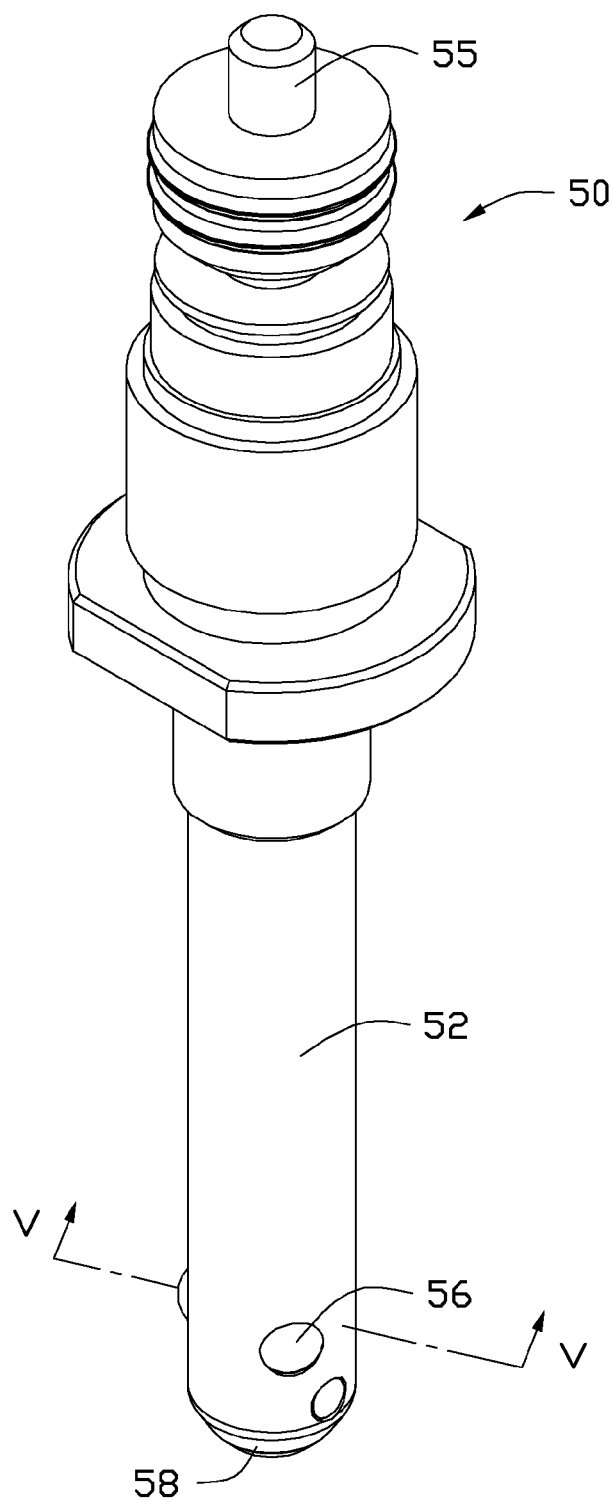
FIG. 3 is an enlarged, isometric view of the robotic claw of FIG. 2.
Figure 4:
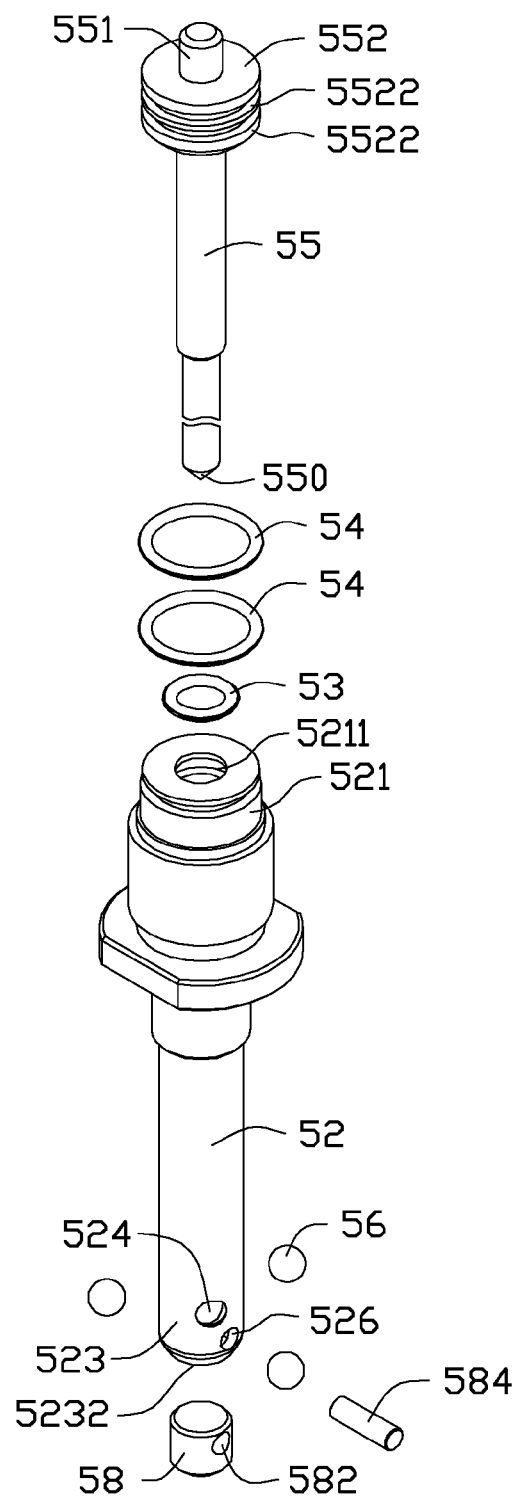
FIG. 4 is an exploded, isometric view of the robotic claw of FIG. 3.
Figure 5:
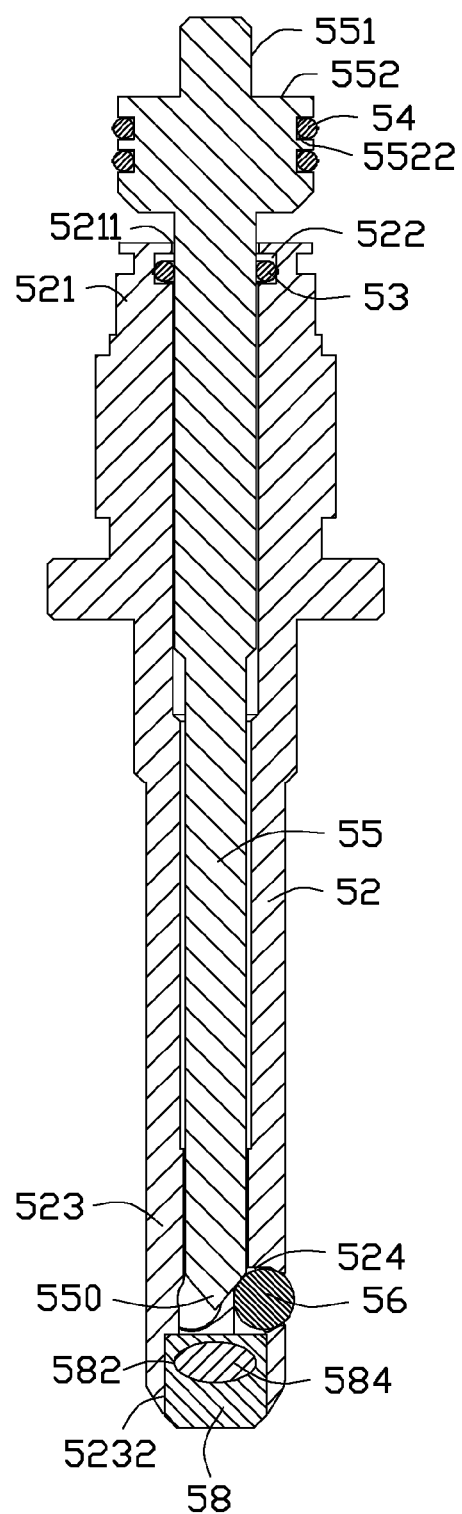
FIG. 5 is a partial, cross-section of the robotic claw of FIG. 3, taken along line V-V.

Referring to FIG. 3 through FIG. 5, each of the claws 50 includes a sleeve 52, a rod 55, three balls 56, and a plunger 58. The rod 55 and the balls 56 are all received in the sleeve 52, and the plunger 58 seals an end of the sleeve 52.

The sleeve 52 is substantially cylindrical. The sleeve 52 includes a mounting portion 521 at an end of the sleeve 52 and a clamping portion 523 at the opposite end of the sleeve 52. The mounting portion 521 defines a mounting hole 5211 at an end of the mounting portion 521. The mounting portion 521 further includes an annular groove 522 defined at a top of an inner wall of the mounting hole 5211. A seal member 53 is received in the annular groove 522. The clamping portion 523 defines an assembling hole 5232 at an end of the clamping portion 523. The assembling hole 5232 communicates with the mounting hole 5211. The diameter of the assembling hole 5232 exceeds the diameter of the mounting hole 5211. The mounting hole 5211 and the assembling hole 5232 cooperatively form a stepped through hole. In the illustrated embodiment, the clamping portion 523 defines three receiving through holes 524 distributed evenly in the cylindrical side surface of the sleeve 52 at the transitional region of the mounting hole 5211 and the assembling hole 5232. The through holes 524 are circular holes communicating with the assembling hole 5232 to receive the balls 56. The number of the balls 56 is the same as the number of the through holes 524, and the diameter of each ball 56 is slightly greater than the diameter of each through hole 524. If the mounting hole 5211 is too small for the balls 56 to be received in the through hole 524 through the mounting hole 5211, the balls 56 can be received in the through hole 524 through the assembling hole 5232. A fixing hole 526 is defined in the clamping portion 523 located adjacent to an end of clamping portion 523 and apart from the receiving through holes 524.

The rod 55 includes an urging portion 550 at an end of the rod 55 and a fixing portion 551 at the opposite end of the rod 55. A distal end of the urging portion 550 is conical. The urging portion 550 is movably received in the sleeve 52. The urging portion 550 can move axially towards the clamping portion 523 of the sleeve 52 to push the balls 56 toward the receiving through holes 524. The fixing portion 551 includes a shaft shoulder 552, and two annular grooves 5522 defined in the outer side of the shaft shoulder 552. Two seal elements 54 are received in the two annular grooves 5522.

In the illustrated embodiment, the plunger 58 is substantially cylindrical. The plunger 58 seals the assembling hole 5232 to prevent the balls 56 from dropping out of the through hole 524. The plunger 58 further defines a tapped hole 582. The plunger 58 includes a threaded rod 584 mounted in the fixing hole 526 and the tapped hole 582 to fix the plunger 58 to the assembling hole 5232.

During the assembly of the robot 100, the balls 56 are received in the through hole 524 through the assembling hole 5232, and the plunger 58 is fixed to the assembling hole 5232 by the rod 584. Then the seal member 53 is received in the annular groove 522, the two seal elements 54 are received in the two annular grooves 5522 correspondingly, and the urging portion 550 is movably received in the sleeve 52. At last, the two pairs of claws 50, the two pairs of tubes 304, and the one pair of position sensors 40 are all assembled on the cylinder 30, and the cylinder 30 is fixed to an end of the arm 20.

When an object is to be grasped by the claw 50, the clamping portion 523 of each claw 50 is inserted into one latching hole of the object correspondingly. At this time, the cylinder 30 moves the urging portion 550 toward the clamping portion 523, and the urging portion 550 pushes the balls 56 toward the receiving through holes 524. The balls 56 partially extend out of the receiving through holes 524, and the urging portion 550 is moved until each ball 56 reaches one latching groove of the object correspondingly. Therefore, the object is grasped by the claw 50.

When an object is to be released by the claw 50, the cylinder 30 moves the urging portion 550 toward the mounting portion 521, and the balls 56 are drawn back into the through holes 524 and slided out of the latching grooves of the object, thereby releasing the object.

By controlling the balls 56 to engage in or slide out of the latching grooves of the object, the claw 50 can grasp and release the object. Therefore, the claw 50 occupies a relatively small space and has a relatively simple structure.

In summary, because the diameter of the assembling hole 5232 exceeds the diameter of the mounting hole 5211, when the latching hole defined in the object is smaller and the balls 56 cannot be received in the receiving through holes 524 through the mounting hole 5211, the balls 56 can then be mounted in the through hole 524 through the assembling hole 5232.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A robotic claw for holding an object that defines a latching hole at the outer surface thereof, the robotic claw comprising:
    a sleeve comprising a mounting portion and a clamping portion, a mounting hole defined at an end of the mounting portion, a plurality of receiving through holes defined in the clamping portion, and an assembling hole defined at an end of the clamping portion and communicating with each of the plurality of receiving through holes;
    a plurality of balls movably received in the receiving through holes correspondingly;
    a rod comprising an urging portion movably received in the sleeve to push the balls toward the receiving through holes;
    a plunger sealing the assembling hole to prevent the balls from dropping out of the receiving through holes;
    wherein the balls are mounted in the receiving through holes through the assembling hole;
    wherein the clamping portion defines a fixing hole located adjacent to an end of the clamping portion apart from the receiving through holes, the plunger defines a tapped hole, and the plunger comprises a threaded rod mounted into the fixing hole and the tapped hole to fix the plunger to the assembling hole.

2. The robotic claw of claim 1, wherein the sleeve has a cylindrical side surface, and the receiving through holes are distributed evenly in the cylindrical side surface of the sleeve.

3. The robotic claw of claim 2, wherein a transitional region is located between the mounting hole and assembling hole, and the receiving through holes are defined at the transitional region.

4. The robotic claw of claim 1, wherein the diameter of the assembling hole exceeds the diameter of the mounting hole.

5. The robotic claw of claim 1, wherein the diameter of each ball is slightly greater than the diameter of each receiving through hole correspondingly.

6. The robotic claw of claim 1, wherein the robotic claw further comprises a seal member; an inner wall of the mounting hole defines an annular groove to receive the seal member.

7. The robotic claw of claim 1, further comprising one or more seal elements, the rod further comprises a fixing portion, and the fixing portion further comprises a shaft shoulder, and one or more annular grooves defined in the outer side of the shaft shoulder to receive the one or more seal elements, respectively.

8. The robotic claw of claim 1, wherein a distal end of the urging portion is conical.

9. A robot for holding an object that defines a latching hole at the outer surface of the object, the robot comprising:
    a robotic arm,
    an air cylinder,
    a plurality of position sensors, and
    a plurality of robot claws, each robot claw comprises:
    a sleeve comprising a mounting portion and a clamping portion, a mounting hole defined at an end of the mounting portion, a plurality of receiving through holes defined in the clamping portion, and an assembling hole defined at an end of the clamping portion and communicating with each of the plurality of receiving through holes;
    a plurality of balls movably received in the receiving through holes correspondingly;
    a rod comprising an urging portion movably received in the sleeve to push the balls toward the receiving through holes;
    a plunger sealing the assembling hole to prevent the balls from dropping out of the receiving through holes;
    wherein the balls are mounted in the receiving through holes through the assembling hole;
    wherein the clamping portion defines a fixing hole located adjacent to an end of the clamping portion and apart from the receiving through holes, the plunger defines a tapped hole, and the plunger comprises a threaded rod mounted into the fixing hole and the tapped hole to fix the plunger to the assembling hole.

10. The robot of claim 9, wherein the sleeve has a cylindrical side surface, and the receiving through holes are distributed evenly in the cylindrical side surface of the sleeve.

11. The robot of claim 10, wherein a transitional region is located between the mounting hole and assembling hole, and the receiving through holes are defined at the transitional region.

12. The robot of claim 9, wherein the diameter of the assembling hole exceeds the diameter of the mounting hole.

13. The robot of claim 9, wherein the diameter of each ball is slightly greater than the diameter of each receiving through hole correspondingly.

14. The robot of claim 9, wherein the robotic claw further comprises a seal member; an inner wall of the mounting hole defines an annular groove to receive the seal member.

15. The robot of claim 9, wherein the robotic claw further comprises a plurality of seal elements, the rod further comprises a fixing portion, the fixing portion of the rod further comprises a shaft shoulder, and a plurality of annular groove defined in the outer side of the shaft shoulder to receive the seal elements, respectively.

16. The robot of claim 9, wherein a distal end of the urging portion is conical 17. The robot of claim 9, wherein each of the plurality of position sensors is to sense the distance from the robotic claw to an object to be held by the robotic claw.

* * * * *